United States Patent
Velavicius et al.

[15] 3,690,036
[45] Sept. 12, 1972

[54] CONTROL UNIT FOR WINDOW REGULATOR AND CLOSURE LATCH

[72] Inventors: Alfonsas Velavicius; Bert R. Wanlass, both of Warren, Mich.

[73] Assignee: General Motors Corporation, Detroit, Mich.

[22] Filed: April 29, 1971

[21] Appl. No.: 138,588

[52] U.S. Cl. .......................... 49/279, 49/40, 49/103, 49/351
[51] Int. Cl. ............................................ E05f 11/38
[58] Field of Search........ 49/40, 41, 72, 103, 98, 279, 49/281, 300, 348 L, 353, 360, 363, 372

[56] References Cited

UNITED STATES PATENTS

| | | | |
|---|---|---|---|
| 2,081,251 | 5/1937 | Rightmyer | 49/72 |
| 3,159,392 | 12/1964 | Pollak | 49/351 X |
| 3,193,275 | 7/1965 | Krueger | 49/351 |
| 3,203,691 | 8/1965 | Pollak | 49/351 |
| 3,211,492 | 10/1965 | Wozena et al. | 160/97 |
| 3,567,209 | 3/1971 | Lather | 49/40 X |

FOREIGN PATENTS OR APPLICATIONS

| | | | |
|---|---|---|---|
| 987,579 | 3/1965 | Great Britain | 49/72 |

Primary Examiner—J. Karl Bell
Attorney—W. E. Finken and D. L. Ellis

[57] ABSTRACT

A self-contained control unit for a first vehicle body closure movable by a rotary input regulator and a second vehicle body closure manually movable and maintained in a closed position by a latch, the control unit including an escutcheon adapted for mounting on a vehicle body and rotatably supporting a regulator drive shaft and a release shaft, a drive member adapted to drive the regulator and rotatably supported on the drive shaft, a first sliding clutch on the drive shaft having a collar thereon, the first clutch being spring biased toward a coupling position coupling the drive shaft to the drive member, a second sliding clutch on the release shaft, the second clutch having an actuating arm adapted to release the closure latch when the second clutch is rotated and a collar engaging the collar on the first clutch, the second clutch being movable to a coupling position drivingly coupled to the release shaft for unitary rotation therewith while the two collars and the spring cooperate to synchronize movement of the two clutches, and a lock controlled cylinder cam rotatably supported on the escutcheon and operative to move the second clutch in and out of the coupling position thereof thereby to effect simultaneous isolation of both the latch and the regulator.

5 Claims, 6 Drawing Figures

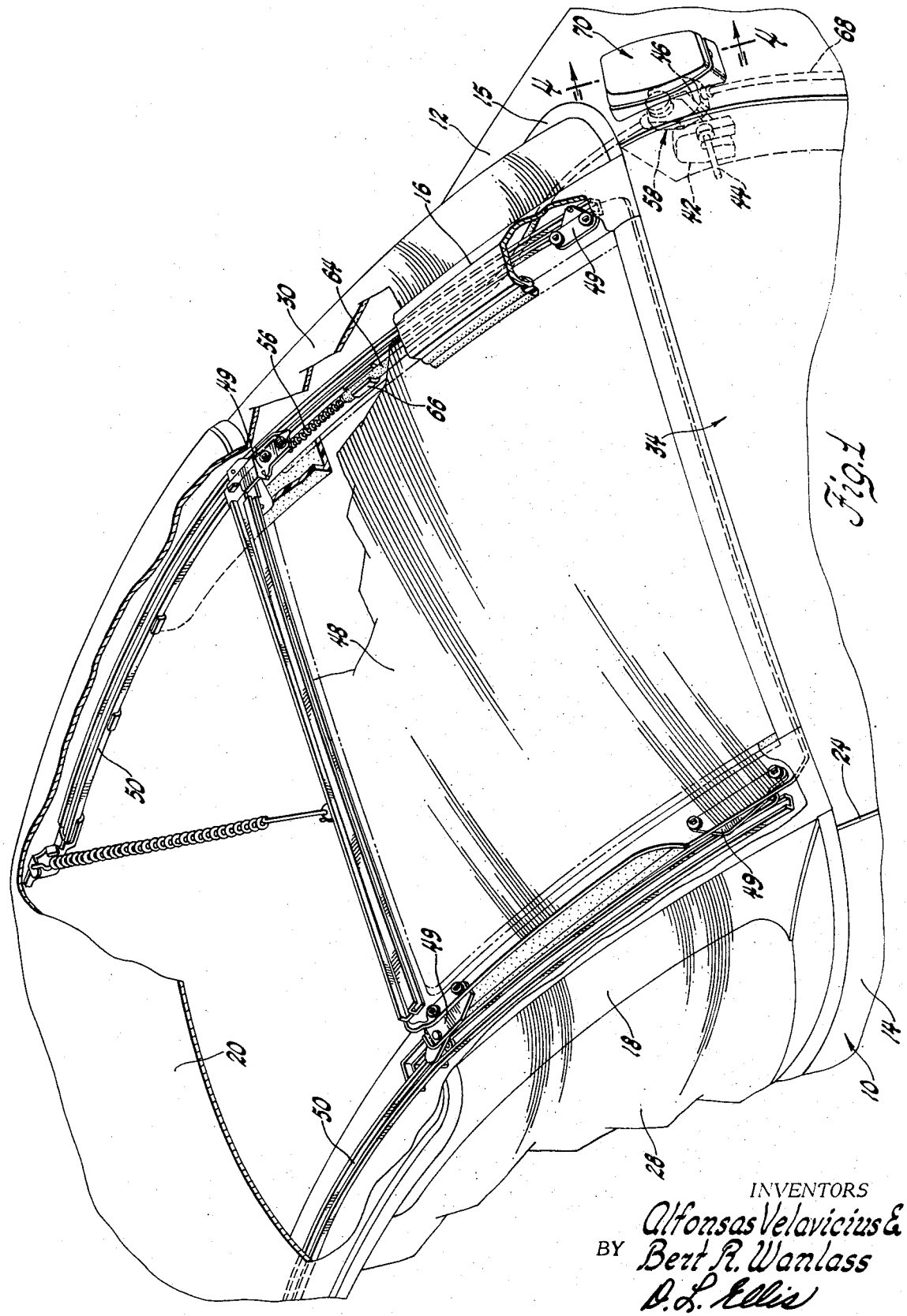

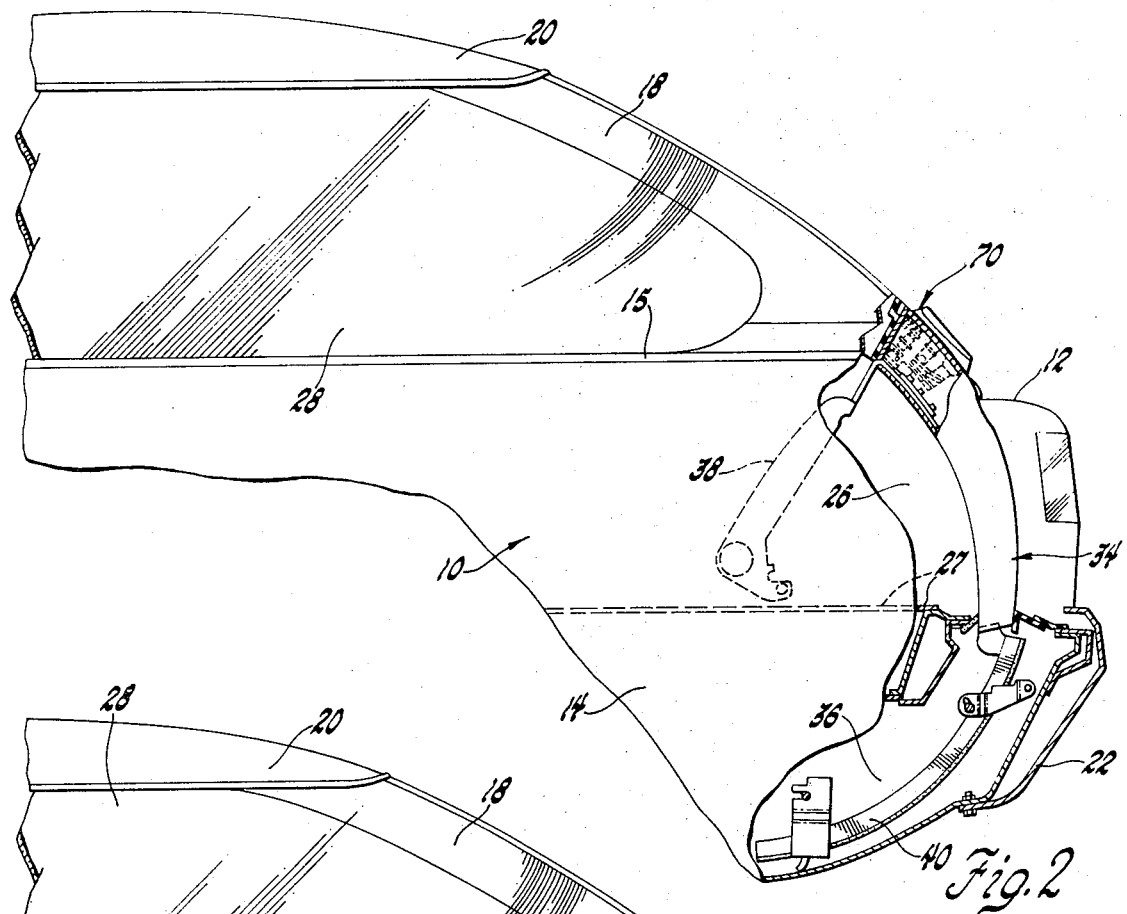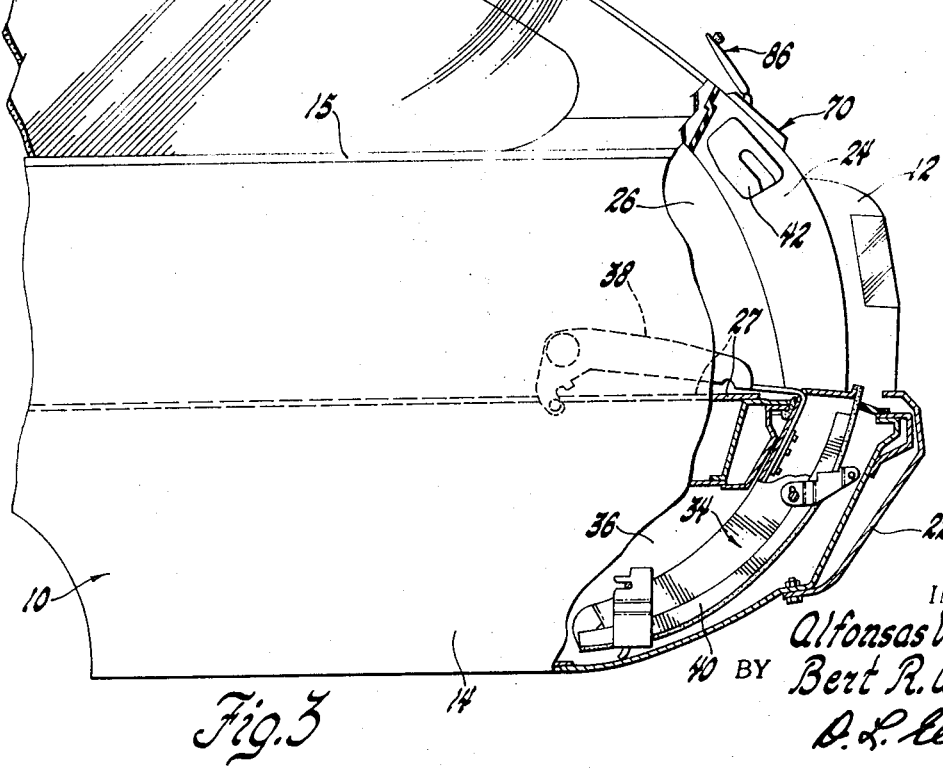

INVENTORS
Alfonsas Velavicius &
BY Bert R. Wanlass
D. L. Ellis
ATTORNEY

CONTROL UNIT FOR WINDOW REGULATOR AND CLOSURE LATCH

This invention relates generally to vehicle bodies and in particular to a control unit for effecting simultaneous locking or unlocking of each of a pair of independently movable vehicle body closures.

There is disclosed in the copending application of Michael W. Lathers, Ser. No. 816,719 filed Apr. 16, 1969 now U.S. Pat. No. 3,567,209 and assigned to the assignee of this invention, a new closure arrangement for a station wagon type vehicle body, the arrangement featuring a tailgate supported on the vehicle body for substantially vertical movement between a closed position closing the lower portion of the vehicle body rear opening and an open position stowed below the vehicle body load floor. Also featured in the new arrangement is a window supported on the vehicle body for substantially vertical movement independently of the tailgate between a closed position closing the upper portion of the rear opening above the tailgate and an open position stowed in the vehicle body roof structure. A window regulator and latch control unit according to this invention, while being of general utility, is particularly adapted to facilitate convenient manual operation of both the window and the tailgate in such an arrangement.

The primary feature of this invention is that it provides new and improved control means for a pair of movable vehicle body closures. Another feature of this invention is that it provides a self-contained control unit particularly adapted for installation on a station wagon type vehicle body having oppositely generally vertically moving window and tailgate closure members, the control unit including means for simultaneously securing both the window and the tailgate against unauthorized manipulation. Still other features of this invention reside in the provision in the control unit of a window regulator drive member and a tailgate latch release arm and in the provision of a pair of synchronized clutches which function to simultaneously couple and uncouple the drive member and release arm and appropriate exterior operating handles thereby to selectively disable the handles for securing the tailgate and window against unauthorized operation. A further feature of this invention resides in the provision in the control unit of a cylinder cam actuated by a lock cylinder, the cylinder cam operatively engaging one of the two synchronized clutches so that rotation of the lock cylinder effects simultaneous movement of both clutches between the coupling and uncoupling positions.

These and other features of this invention will be readily apparent from the following specification and from the drawings wherein:

FIG. 1 is a fragmentary partially broken away perspective view of the rear portion of a station wagon type vehicle body having a window regulator and latch control unit according to this invention;

FIG. 2 is a fragmentary partially broken away side elevational view of the rear portion of a station wagon type vehicle body showing the tailgate in closed position;

FIG. 3 is similar to FIG. 2 but showing the tailgate in open position;

Figure 4:
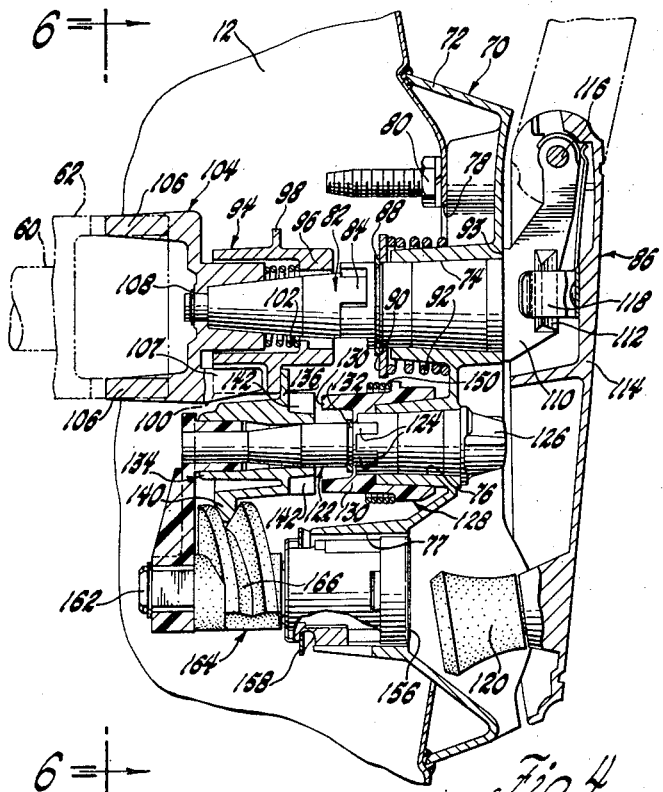
FIG. 4 is an enlarged sectional view taken generally along the plane indicated by lines 4—4 in FIG. 1 and showing the window regulator and latch control unit in a locked configuration.

Referring now to FIGS. 1, 2, and 3 of the drawings, there is shown the rear portion of a station wagon type vehicle body designated generally 10 including a right quarter panel structure 12 and a left quarter panel structure 14, the quarter panel structures defining a body belt line 15. A right body pillar 16 and a left body pillar 18 slant forwardly and up in parallel relation from the quarter panel structures to a roof structure 20 of the vehicle body. A bumper member 22 extends transversely of the vehicle body between the quarter panel structures and cooperates with the latter, the body pillars, and the roof structure in defining a generally rectangular rear opening 24 through which access may be had to a cargo compartment 26 having a load supporting floor 27, FIGS. 2 and 3. A pair of side windows 28 and 30 are received in respective ones of a pair of window openings between the roof structure and the quarter panel structures, each window curving around the rear of the vehicle body and into sealing engagement with a corresponding one of the body pillars 16 and 18.

The lower portion of the rear opening 24 generally below the vehicle belt line 15 is adapted to be selectively closed by a tailgate 34 supported on the vehicle body for generally vertical movement between a closed position, FIGS. 1 and 2, in the rear opening and an open position, FIG. 3, stowed within a well 36 below the load floor 27 and forward of the bumper member 22. The tailgate is supported on the vehicle body for such movement by a lift arm 38 and is guided by a pair of cam channels, only left cam channel 40 being shown in FIGS. 2 and 3. For a full and complete description of the tailgate installation reference may be made to the copending application of Bert R. Wanlass, Ser. No. 72,685 filed Sept. 16, 1970 and assigned to the assignee of this invention.

The tailgate 34 is adapted to be manually moved from the closed to the open position by application of a relatively small force on the upper edge thereof directed generally vertically down, return movement toward the closed position being facilitated by counterbalance means, not shown, which function to bring the tailgate to an intermediate position, not shown, somewhat below the closed position, FIGS. 1 and 2. For a full and complete description of the tailgate counterbalance means reference may be made to the copending application of Alfonsas Velavicius, et al., Ser. No. 72,323 filed Sept. 15, 1970 and assigned to the assignee of this invention. The relatively small vertical distance remaining between the closed position and the intermediate position is traversed by the tailgate in response to the application of a relatively small force thereon directed vertically up, the tailgate being maintained in the closed position by a latch 42 situated on right quarter panel structure 12 and engaging a headed striker 44 fixed to the right side panel of the tailgate adjacent the upper edge thereof. When the latch 42 is actuated to release the striker 44, as by downward movement of a release lever 46, FIGS. 1 and 6, the tailgate 34 descends under the influence of gravity from the closed position to the intermediate position wherein downward opening force may conveniently be applied. For a full and complete description of the latch 42 and the striker 44 reference may be made to the copending application of Bert R. Wanlass, et al. Ser. No. 72,735 filed Sept. 16, 1970 and assigned to the assignee of this invention.

As best seen in FIG. 1, the portion of the rear opening 24 generally above the belt line 15 is adapted to be closed by a window 48 movable between a closed position, FIG. 1, in the rear opening and an open position, not shown, stowed within the roof structure 20. The window 48 is supported on the vehicle body by four roller followers, not shown, attached to the window by a plurality of bracket assemblies 49, the two followers on each vertically extending side of the window being guidingly received in a corresponding one of a pair of cam channels 50 rigidly attached to the vehicle body within the pillar structures and the roof structure. For a full and complete description of the window installation reference may be made to the copending application of Charles A. Stebbins, Ser. No. 72,330, filed Sept. 11, 1970 and assigned to the assignee of this invention.

The window 48 is moved between the open and closed positions by a cable 56 attached at its remote end to the roller support bracket 49 at the upper right corner of the window. At its lower end, the cable 56 engages an appropriate drive arrangement housed within a window regulator 58 mounted on the vehicle body within right quarter panel structure 12. The regulator 58 is of the rotary input variety wherein rotary motion of an input shaft is converted into bodily movement of the cable 56 and includes an input shaft 60 having a collar 62 thereon, both the input shaft and collar being shown schematically in broken lines in FIGS. 4 and 5. The cable 56 reciprocates within a tubular conduit 64 fastened to the vehicle body within right pillar 16 by a bracket 66 and to the regulator 58. Another conduit 68 is attached to the lower end of the regulator 58 and extends downwardly into the right quarter panel structure, the conduit 68 functioning only to stow the lower end of the cable 56 when the window is closed. A window regulator and latch control unit according to this invention and designated generally 70 is supported on the right quarter panel structure generally adjacent the latch 42 and the regulator 58.

Figure 6:
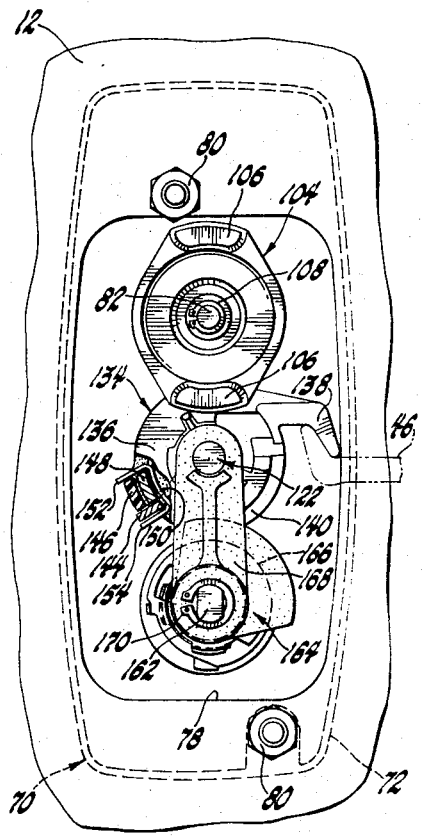
FIG. 6 is a partially broken away sectional view taken generally along the plane indicated by lines 6—6 in FIG. 4.
Figure 5:
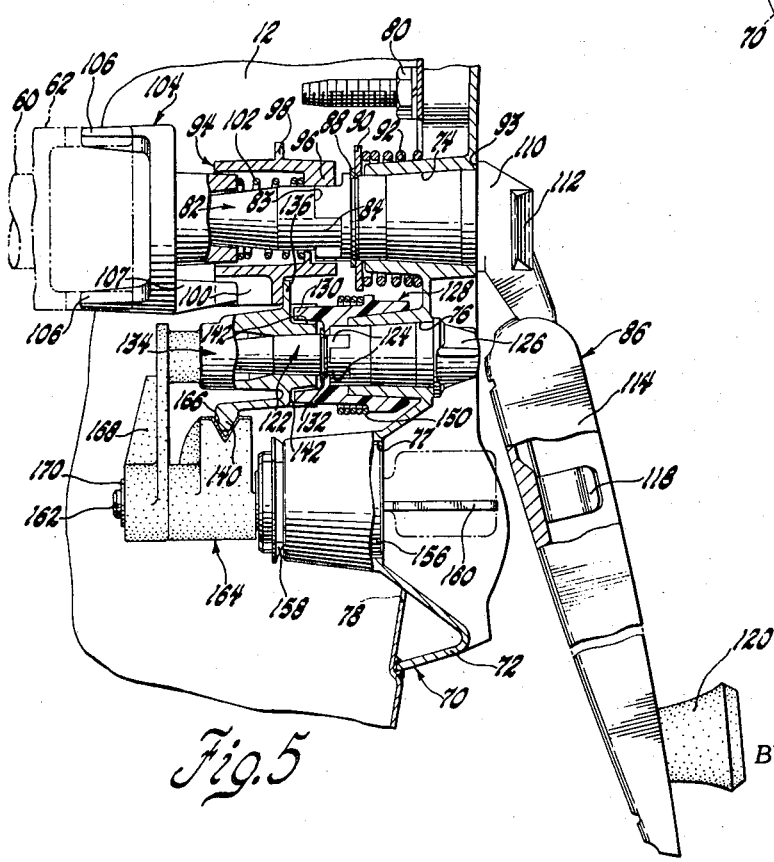
FIG. 5 is similar to FIG. 4 but showing the window regulator and latch control unit in an unlocked configuration.

Referring now to FIGS. 4, 5, and 6, the regulator and latch control unit 70 includes a generally rectangular escutcheon 72 defining a first bore 74, a second bore 76 and a third bore 77, the escutcheon being adapted for connection to the right quarter panel structure 12 generally over an aperture 78 therein by a pair of threaded fasteners 80. A regulator drive shaft 82 having a shoulder 83 with a plurality of receptacle notches 84 therein is rotatably supported within the first bore 74 and has rigidly attached thereto outboard of the escutcheon a crank handle assembly 86. The drive shaft 82 is retained on the escutcheon by a retaining ring 88 which also retains a washer 90 surrounding the drive shaft. A compression spring 92 seats at one end against washer 90 and at the other end against the escutcheon to generate a predetermined amount of frictional resistance to rotation between a shoulder 93 on the drive shaft and the escutcheon. A first sliding clutch member 94 having a plurality of clutch dogs 96 adapted for reception in the receptacles 84, an annular collar 98, and a single tooth 100, is supported on the drive shaft 82 for rotation and for bodily movement axially of the shaft 82 between a coupling position, FIG. 5, wherein the clutch dogs 96 engage receptacles 84 and an uncoupling position, FIG. 4, wherein the clutch dogs are remote from the receptacles. A compression spring 102 surrounds the drive shaft within the first clutch member 94 and bears at one end against an internal shoulder of the latter and at the other end against a drive member 104 having a pair of forks 106 and a single tooth 107, FIG. 5, the drive member being rotatably supported on the drive shaft 82 and retained thereon by a retaining ring 108. The forks 106 on the drive member are adapted to drivingly engage the collar 62 on the regulator input shaft 60.

As seen best in FIGS. 4 and 5, the crank handle assembly 86 includes an eccentric hub 110 having a pair of gripping lugs 112 thereon. A handle 114 is supported on the hub 110 for pivotal movement about a pin 116 between a folded position, shown in FIGS. 1 and 4, and an unfolded position, shown in FIG. 5 and in broken lines in FIG. 4. The handle 114 supports a spring clip 118 and a rotatable knob 120. In the unfolded position of the handle 114 the knob 120 is exposed to provide a convenient grip whereby the handle can be rotated to rotate the drive shaft 82 through the hub 110. In the folded position the handle 114 is generally longitudinally aligned with the escutcheon, the knob 120 being housed in a deep recess in the escutcheon while the spring clip 118 resiliently engages lugs 112.

Referring again to FIGS. 4 and 5, a release shaft 122 having a plurality of circumferential teeth 124 thereon is rotatably supported in the second bore 76 in the escutcheon and has rigidly attached thereto outboard of the escutcheon a release handle in the form of a finger grip 126. A generally cylindrical collar 128 having a plurality of internal teeth, not shown, and a pair of diametrically opposed clutch dogs 130 is supported on the release shaft 122 with the teeth of the former engaging the teeth 124 of the latter so that the collar 128 is rotatable as a unit with the release shaft. The collar 128 is restrained against axial movement relative to the release shaft by a retaining ring 132. A second sliding clutch member 134 having a semicircular collar 136, an actuating arm 138, a semicircular cam follower 140, and a plurality of clutch receptacles 142, is supported on the release shaft 122 with collar 136 overlying collar 98 on the first sliding clutch member 94 and with the actuating arm 138 generally overlying the latch release lever 46 for rotation and for bodily movement axially of the release shaft between a coupling position, FIG. 5, wherein the clutch dogs 130 engage the receptacles 142 and an uncoupling position, FIG. 4, wherein the clutch dogs are remote from the receptacles.

As seen best in FIG. 6, a rigid abutment 144 integral with and projecting inwardly from the escutcheon underlies a longitudinally extending tab 146 integral with the collar 128 and an adjacent tab 148 integral with the second sliding clutch member 134. A torsion spring 150 coiled about collar 128 has a first leg 152 overlying both tabs 146 and 148 and a second leg 154 underlying abutment 144, the spring thereby biasing both the collar 128 and the second sliding clutch member 134 counterclockwise, FIG. 6, toward rest positions wherein the clutch dogs 130 on the collar 128 are in axial alignment with the clutch receptacles 142 on the clutch member.

Referring now to FIGS. 4, 5, and 6, a conventional lock cylinder assembly is disposed in third bore 77 of the escutcheon and includes a sleeve 156 rotatably supporting a lock cylinder, not shown. The sleeve 156 is held stationary with respect to the escutcheon by conventional tongue and groove means and is retained on the escutcheon by an annular Bellville type spring 158. The lock cylinder is preferably of conventional structure with a series of key operable tumblers and a side lock bar, not shown, extensible by key withdrawl to selectively lock the cylinder in a fixed rotary position within the sleeve 156. Upon insertion of a key 160 into the lock cylinder, the side bar is withdrawn to allow rotation of the latter generally through an angle of approximately 90° from the broken line position to the solid line position as shown in FIG. 5.

A cam shaft 162 having diametrically opposed milled flats thereon is secured to the lock cylinder for unitary rotation therewith and projects inwardly therefrom. A cylinder cam member 164 having a helical cam groove 166 therein is supported on the shaft 162 and is keyed to the latter for unitary rotation therewith by the milled flats, the helical groove 166 engaging the semicircular cam follower 140 on the second sliding clutch member 134. The inboard end of the cam shaft 162 is rotatably received within a bore in a brace 168, the brace being rotatably piloted on the inner end of release shaft 122 and retained on the cam shaft by a retaining ring 170.

A typical operational sequence of the regulator and latch control unit 70 normally begins with the tailgate 34 and window 48 closed and with the control unit in a locked configuration, FIG. 4, wherein the key 160 is removed and the cam member 164 positioned such that the second sliding clutch member 134 is in the uncoupling position thereof. The collar 136 on the second sliding clutch member 134 engages annular collar 98 on the first sliding clutch member 94 to maintain the latter in the uncoupling position against the action of spring 102. Accordingly, in the locked configuration, rotation of crank handle assembly 86 is ineffective to rotate the regulator drive shaft 82 and rotation of the finger grip 126 on the release shaft 122 is ineffective to rotate the second sliding clutch member 134 for actuation of release lever. The window regulator 58 is thus inoperative from outside of the vehicle body as is the latch 42 so that both the window and the tailgate are secured against unauthorized manipulation.

To transform the regulator and latch control unit 70 from the locked to an unlocked configuration, FIG. 5, the handle 114 is moved from the folded to the unfolded position and the key 160 inserted in the lock cylinder and rotated from the broken to the solid line position, FIG. 5, which rotation concurrently rotates the cam member 164 from the position of FIG. 4 to the position of FIG. 5. As the cylinder cam rotates the cam groove 166 therein cooperates with the follower 140 to bodily shift the second sliding clutch member 134 from the uncoupling to the coupling position. Simultaneously, the restraint on spring 102 provided by engagement between collars 98 and 136 on the first and second sliding clutch members is removed so that the former is moved synchronously with the latter by spring 102 toward the coupling position which position is achieved if the clutch dogs 96 are in alignment with the receptacles 84. If the clutch dogs 96 and the receptacles 84 are not initially in axial alignment the spring 102 maintains the first sliding clutch member in abutting relation against shoulder 83 on the drive shaft until alignment is achieved as described hereinafter.

With the regulator and latch control unit in the unlocked configuration, rotation of the finger grip 126 and release shaft 134 induces corresponding clockwise rotation, FIG. 6, of the second sliding clutch member 134 through the collar 128, dogs 130 and receptacles 142. As the second sliding clutch member is so rotated, the actuating arm 138 thereon depresses release lever 46 of the latch 42 thereby to initiate release of the striker 44 to permit manual opening of the tailgate 34. When the finger grip 126 is subsequently released, the torsion spring 150 returns both the second sliding clutch member 134 and the collar 128 to their original rest positions wherein the tabs 146 and 148 engage abutment 144 on the escutcheon.

If the coupling position of the first sliding clutch member 94 is initially achieved during transformation of the regulator and latch control unit from the locked to the unlocked configuration, subsequent rotation of the handle 114 initiates corresponding rotation of the first sliding clutch member through the engaged clutch dogs and receptacles, the rotation of the first sliding clutch member being imparted to the drive member 104 through engagement between the tooth 107 on the latter and the tooth 100 on the former so that the regulator 58 is manually driven by the handle 114 to raise the window 48. If, however, the dogs 96 are not initially aligned with the receptacles 84, rotation of the handle 114 initiates rotation of the drive shaft 82 relative to the first sliding clutch member until alignment is achieved whereupon the spring 102 forces the clutch member into the coupling position, the first sliding clutch member being held stationary until alignment is achieved by the resistance to movement of the shaft 60 as transmitted through the drive member 104.

When the desired movement into or out of the vehicle body through the rear opening is completed, the tailgate 34 is manually lifted to the closed position whereupon the striker 44 is retainingly engaged by the latch 42 with the release lever 46 being repositioned below the actuating arm 138 for a repeated unlatching cycle. Subsequently, the handle 114 is rotated in a reverse direction to bring the window 48 from the open to the closed position, FIG. 1. If, when the window achieves the closed position, the handle 114 is not in the proper angular orientation for pivotal movement from the unfolded to the folded position, the operator merely reverses the direction of rotation of the handle until proper alignment is achieved. The reverse rotation is accompanied by relative angular movement between the first sliding clutch member 94 and the drive member 104 since the single teeth 100 and 107 on the clutch member and drive member, respectively, permit approximately 300° of relative rotation before driving engagement of the teeth in the opposite direction is effected. Before the handle 114 is pivoted from the unfolded to the folded position, the key 160 is rotated from the solid to the broken line position thereof, FIG. 5, to simultaneously or synchronously move the first and second sliding clutch members from the coupling to the uncoupling positions and thus return the control unit to the locked configuration. After the key 160 is removed, the handle is brought to the folded position with the knob 120 occupying the space vacated by the key.

It will, of course, be apparent to those skilled in the art that the control unit 70 is self-contained and particularly adapted for remote preassembly. As seen best in FIGS. 5 and 6, the only connection between the control unit and the operating elements attached to the vehicle body involves the engagement between collar 62 on the regulator input shaft and the drive member 104 of the control unit, the actuating arm 138 merely overlying the release lever 46 rather than being permanently attached thereto. Accordingly, since the connection between the collar and drive member is of the simple drive dog and receptacle variety, the entire control unit can be installed or removed without disturbing other elements of the system.

Having thus described the invention, what is claimed is:

1. In a vehicle body having an opening therein a portion of which opening is adapted to be closed by a first movable closure and another portion of which opening is adapted to be closed by a second movable closure, the combination comprising, a first operating member, means rotatably supporting said first operating member on said vehicle body, means operable to maintain said first closure in the closed position thereof and responsive to rotation of said first operating member for permitting movement of said first closure to the open position thereof, a second operating member, means rotatably supporting said second operating member on said vehicle body, means operable to maintain said second closure in the closed position thereof and responsive to rotation of said second operating member for permitting movement of said second closure to the open position thereof, a first handle means, means rotatably supporting said first handle means on said vehicle body, a second handle means, means rotatably supporting said second handle means on said vehicle body, a first clutch means disposed between said first operating member and said first handle means and actuable from an uncoupling position to a coupling position drivingly connecting said first handle means to said first operating member, a second clutch means disposed between said second operating member and said second handle means and actuable from an uncoupling position to a coupling position drivingly connecting said second handle means to said second operating member, synchronizing means between said first and said second clutch means operative to effect synchronous movement of each between the coupling and the uncoupling positions, and control means operatively connected to one of said first and said second clutch means and actuable between a first position and a second position to move said one clutch means between the uncoupling and the coupling positions thereof.

2. In a vehicle body having an opening therein a portion of which opening is adapted to be selectively closed by a first closure movable between open and closed positions by a rotary input regulator means and another portion of which opening is adapted to be closed by a second closure movable between open and closed positions, said second closure being maintained in the closed position by a latch actuable to an unlatching position wherein said second closure is released for movement to the open position thereof, in said vehicle body the combination comprising, a regulator drive member, means rotatably supporting said regulator drive member on said vehicle body in driving engagement with said regulator means, a latch release member, means supporting said release member on said vehicle body for rotary movement between a retracted position and an extended latch releasing position actuating said latch to the unlatching position thereof, a regulator drive handle, means rotatably supporting said drive handle on said vehicle body, a latch release handle, means rotatably supporting said release handle on said vehicle body for movement between a plurality of positions corresponding to the retracted and the extended positions of said release member, first clutch means disposed between said regulator drive member and said regulator drive handle and actuable from an uncoupling position to a coupling position drivingly connecting said drive handle to said drive member, second clutch means disposed between said release member and said release handle and actuable from an uncoupling position to a coupling position drivingly connecting said release handle to said release member, synchronizing means between said first and said second clutch means operative to effect synchronous movement of each between the coupling and the uncoupling positions, and lock means operatively connected to one of said first and said clutch means and actuable between a locked position and an unlocked position to move said one clutch means respectively between the uncoupling and the coupling positions thereof.

3. In combination with a vehicle body having an opening therein a portion of which opening is adapted to be selectively closed by a first closure movable between open and closed positions by a rotary input regulator means and another portion of which opening is adapted to be closed by a second closure movable between open and closed positions, said second closure being maintained in the closed position by a latch actuable to an unlatching position wherein said second closure is released for movement to the open position thereof, a self-contained control unit adapted for installation on said vehicle body and operable to effect movement of said first closure between the open and closed positions thereof and movement of said latch to the unlatching position thereof and further operable to simultaneously secure said first and said second closures against unauthorized operation, said control unit comprising, an escutcheon adapted for installation on said vehicle body, a regulator drive member, means rotatably supporting said regulator drive member on said escutcheon, said drive member being adapted for driving engagement with said regulator means when said escutcheon is installed on said vehicle body, a latch release member, means supporting said release member on said escutcheon for rotary movement when said escutcheon is installed on said vehicle body between a retracted position and an extended latch releasing position actuating said latch to the unlatching position thereof, a regulator drive handle, means rotatably supporting said drive handle on said escutcheon, a latch release handle, means rotatably supporting said release handle on said escutcheon for movement between a plurality of positions corresponding to the retracted and the extended positions of said release member, first clutch means disposed between said regulator drive member and said regulator drive handle and actuable from an uncoupling position to a coupling position drivingly connecting said drive handle to said drive member, a second clutch means disposed between said release member and said release handle and actuable from an uncoupling position to a coupling position drivingly connecting said release handle to said release member, synchronizing means between said first and said second clutch means operative to effect synchronous movement of each between the coupling and the uncoupling positions, and lock means on said escutcheon operatively connected to one of said first and said second clutch means and actuable between a locked position and an unlocked position to move said one clutch means respectively between the uncoupling and the coupling positions thereof.

4. In combination with a vehicle body having an opening therein a portion of which opening is adapted to be selectively closed by a first closure movable between open and closed positions by a rotary input regulator means and another portion of which opening is adapted to be closed by a second closure movable between open and closed positions, said second closure being maintained in the closed position by a latch actuable to an unlatching position wherein said second closure is released for movement to the open position thereof, a self-contained control unit adapted for installation on said vehicle body and operable to effect movement of said first closure between the open and closed positions thereof and movement of said latch to the unlatching position thereof and further operable to simultaneously secure said first and said second closures against unauthorized operation, said control unit comprising, an escutcheon adapted for installation on said vehicle body, a regulator drive shaft rotatably supported on said escutcheon, a drive member rotatably supported on said drive shaft, said drive member being adapted for driving engagement with said regulator means when said escutcheon is installed on said vehicle body, a drive handle rigidly attached to said drive shaft for manually rotating the latter, a first clutch disposed between said drive shaft and said drive member including a sliding member movable between an uncoupling position and a coupling position drivingly connecting said drive shaft and said drive member, a release shaft rotatably supported on said escutcheon, a release handle rigidly attached to said release shaft for manually rotating the latter, a latch release member rotatably supported on said release shaft, a second clutch disposed between said release member and said release shaft including a sliding member movable between an uncoupling position and a coupling position drivingly connecting said release member and said release shaft so that said release member is rotatable as a unit with said release shaft between a retracted position and an extended latch releasing position actuating said latch to the unlatching position thereof when said escutcheon is installed on said vehicle body, synchronizing means between said sliding members in said first and said second clutches operable to effect synchronous movement of each between the coupling and the uncoupling positions, an actuating member, means supporting said actuating member on said escutcheon in operative engagement with said sliding member of one of said first and said second clutches for movement between an operative position and an inoperative position corresponding respectively to the coupling and the uncoupling positions of said engaged sliding member, and lock means on said escutcheon drivingly connected to said actuating member and actuable between a locked position and an unlocked position to move said actuating member respectively between the inoperative and the operative positions thereof.

5. In combination with a vehicle body having an opening therein a portion of which opening is adapted to be selectively closed by a first closure movable between open and closed positions by a rotary input regulator means and another portion of which opening is adapted to be closed by a second closure movable between open and closed positions, said second closure being maintained in the closed position by a latch actuable to an unlatching position wherein said second closure is released for movement to the open position thereof, a self-contained control unit adapted for installation on said vehicle body and operable to effect movement of said first closure between the open and closed positions thereof and movement of said latch to the unlatching position thereof and further operable to simultaneously secure said first and said second closures against unauthorized operation, said control unit comprising, an escutcheon adapted for installation on said vehicle body, a regulator drive shaft rotatably supported on said escutcheon, a drive member rotatably supported on said drive shaft, said drive member being adapted for driving engagement with said regulator means when said escutcheon is installed on said vehicle body, a drive handle rigidly attached to said drive shaft for manually rotating the latter, a first clutch including a receptacle fixed to said drive shaft and a sliding dog member rotatably disposed on said drive shaft and operative upon rotation thereof to rotate said drive member, said sliding dog member having a retaining collar thereon and being bodily movable between an uncoupling position and a coupling position engaging said receptacle to drivingly connect said drive member to said drive shaft, spring means biasing said sliding dog member toward the coupling position thereof, a release shaft, means on said release shaft defining a rigid clutch dog, means rotatably supporting said release shaft on said escutcheon, a release handle rigidly attached to said release shaft for manually rotating the latter, a latch release member having thereon a release arm and a retaining collar and a dog receptacle, means supporting said release member on said release shaft for rotation relative to the latter and for bodily movement between an uncoupling position and a coupling position wherein said clutch dog engages said receptacle to drivingly connect said release shaft and said release member so that said release member is rotatable as a unit with said release shaft between a retracted position and an extended latch releasing position actuating said latch to the unlatching position thereof when said escutcheon is installed on said vehicle body, said retaining collar on said release member engaging said retaining collar on said sliding dog to synchronize movement of said sliding dog and said release member between the coupling and the uncoupling positions, a cylindrical cam, means rotatably supporting said cam on said escutcheon, said cam operatively engaging said release member to move the latter between the coupling and the uncoupling positions thereof in response to rotary movement of the former, and lock means on said escutcheon drivingly connected to said cam and actuable between a locked position and an unlocked position to rotate said cam for moving said release member respectively between the uncoupling and the coupling positions thereof.

* * * * *